(12) United States Patent
Roberge et al.

(10) Patent No.: US 8,230,877 B2
(45) Date of Patent: Jul. 31, 2012

(54) MASS FLOW RATE CONTROL SYSTEM

(75) Inventors: Dominique Roberge, Sierre (CH);
Michael Amrhein,
Bussigny-près-Lausanne (CH); Yves Glatz, Lausanne (CH)

(73) Assignee: Lonza AG, Basel (CH)

( * ) Notice: Subject to any disclaimer, the term of this patent is extended or adjusted under 35 U.S.C. 154(b) by 893 days.

(21) Appl. No.: 12/090,596

(22) PCT Filed: Oct. 23, 2006

(86) PCT No.: PCT/EP2006/010203
§ 371 (c)(1),
(2), (4) Date: Jun. 16, 2008

(87) PCT Pub. No.: WO2007/045509
PCT Pub. Date: Apr. 26, 2007

(65) Prior Publication Data
US 2008/0289691 A1    Nov. 27, 2008

(30) Foreign Application Priority Data
Oct. 21, 2005   (EP) ..................................... 05023058

(51) Int. Cl.
*F16K 31/12* (2006.01)
(52) U.S. Cl. ..................... 137/486; 137/487.5; 137/488; 222/58; 222/59

(58) Field of Classification Search .................. 137/455, 137/485, 486, 487.5, 488; 222/58, 59; 73/296
See application file for complete search history.

(56) References Cited

U.S. PATENT DOCUMENTS

| | | | |
|---|---|---|---|
| 3,252,618 A | | 5/1966 | Anderson et al. |
| 5,527,507 A | | 6/1996 | Childers et al. |
| 5,850,757 A | * | 12/1998 | Wierenga ........................ 73/296 |
| 6,148,667 A | * | 11/2000 | Johnson .......................... 73/296 |
| 6,329,013 B1 | * | 12/2001 | Putt ..................................... 427/8 |
| 7,073,392 B2 | * | 7/2006 | Lull et al. ......................... 73/861 |
| 7,584,898 B2 | * | 9/2009 | Schmitt et al. ............. 236/12.12 |
| 7,592,033 B2 | * | 9/2009 | Buckley et al. .................... 427/8 |
| 2002/0189682 A1 | * | 12/2002 | Linthorst ..................... 137/487.5 |
| 2003/0071053 A1 | | 4/2003 | Watling |
| 2003/0121561 A1 | * | 7/2003 | Wagner et al. ..................... 141/9 |
| 2003/0189060 A1 | * | 10/2003 | Osterheld et al. ................... 222/1 |
| 2005/0189018 A1 | * | 9/2005 | Brodeur et al. ............. 137/487.5 |

* cited by examiner

*Primary Examiner* — John K Fristoe, Jr.
*Assistant Examiner* — Jessica Cahill
(74) *Attorney, Agent, or Firm* — Hoffman & Baron, LLP

(57) ABSTRACT

A dosage system for feeding a fluid (A) to a static mixer (1), said system comprising a tank (2) containing said fluid (A) at a predetermined pressure, a fluid passage (3) connecting said container (1) and tank (2), a control valve (4) provided within said fluid passage (3) to control the flow of said fluid (A) from said tank into said container; and a controller (6) for receiving a target flow rate (SP_Q) of said fluid (A), and an actual flow rate (PV_Q) of said fluid (A), and for outputting a control signal (MV_L) to said control valve (4) indicating a valve position to adjust the flow rate. Further provided is a method for controlling said dosage system.

27 Claims, 2 Drawing Sheets

MASS FLOW RATE CONTROL SYSTEM

This application is the U.S. National Phase of, and Applicant claims priority from, International Application Number PCT/EP2006/010203 filed 23 Oct. 2006 and European Application bearing Serial No. 05023058.0 filed 21 Oct. 2005, which are incorporated herein by reference.

BACKGROUND OF THE INVENTION

The present invention relates to a dosage system for a static mixer, in particular a micro-reactor, and a control method thereof.

Static mixers, such as micro reactors, serve for mixing and/or reacting fluids or reactants contained therein. Static mixtures comprise at least one, usually two inlets for the one or more fluids and conventionally said fluids are fed to the mixer by a pump, in particular a piston pump. Such pumps, however, generate pressure fluctuations within the mixer due to their cycle-periodic characteristics. Since in particular in micro-reactors, small-dimensioned static mixers with structured inner cavities and surfaces and with or without temperature control, higher pressures are necessary, enormous pressure pulses occur in such conventional systems. FIG. 3A thereto depicts feed pressure delivered by a conventional piston pump to a microreactor. Such pressure fluctuations, in particular pressure pulses, as occurring in conventional systems including delivery pumps, may adversely affect the chemical reactions within the reactor (selectivity, reaction mechanism, formation of byproducts etc.), in particular if the reaction is micro-mixing controlled or pressure dependent.

In order to apply a desired quantity of fluids, the mass flow rate of each fluid must be measured and controlled with high precision.

A known method for measuring mass flow rates is a so-called coriolis mass flow controller (CMFC). A CMFC comprises a long metal tube vibrating with a certain amplitude. However, these vibrations may degrade the stability of the apparatus and the characteristics inside the microreactor. Furthermore, with known CMFCs the minimum mass flow for accurate measurement must be at least 10 g/min. Additionally, in order to achieve good precision at low flow rates, a tube with very small diameter (less than 1 mm) is necessary, which may cause additional problems in terms of plugging, clogging etc. Moreover, a CMFC requires relative long residence time in the metallic structure, so that problems and undesired side effects like chemical reactions, corrosion, apprehensive effort for pre-heating or pre-cooling may arise.

Therefore, it is an object of the present invention to provide a dosage system for a static mixer, wherein the mass flow can be controlled avoiding or at least decreasing one of the aforementioned drawbacks.

SUMMARY OF THE INVENTION

Said object is solved by a dosage system according to claim 1.

A dosage system for feeding a fluid A to a static mixer 1, said system comprising a tank 2 containing said fluid A at a predetermined pressure and a pressurizing element B providing said predetermined pressure; a fluid passage 3 connecting said static mixer 1 and tank 2; a scale 5 detecting the weight PV_M of fluid A contained in tank 2, a control valve 4 provided within said fluid passage 3 to control the flow of said fluid A from said tank 2 into said static mixer 1; a controller 6 for receiving a target flow rate SP_Q of said fluid A, and an actual flow rate PV_Q of said fluid A; and for outputting a control signal MV_L to said control valve 4 indicating a valve position to adjust the flow rate, and a flow estimator outputting said actual flow rate PV_Q to said controller 6 based on PV_M as detected by said scale 5 at different points of times t0 and t1. Said fluid may be a liquid or a gas, for example a liquid or gaseous reagent or solvent which may or may not have a reagent dissolved therein.

In order to control mass flow of said fluid into said mixer, mass or volume flow must be determined. Thereto a scale and a flow estimator are employed in the dosage system of the present invention. Since the weight of the fluid contained in the tank as well as the overall weight of tank, fluid and pressurizing element, only changes by the flow of said fluid out of the tank, the flow rate of the fluid can be determined based on the weight of the fluid contained in the tank as detected by said scale at different points of times. I.e. if the weight of the fluid within the tank or the overall system has decreased for a certain amount within a certain time period, flow rate of the fluid is given by said amount divided by said time period. Preferably said time periods, at which weight is detected by the scale and processed by said flow estimator, are chosen small enough to yield sufficient accuracy of the flow rate, but large enough to avoid sample noise.

With such control of mass flow, in contrast to known CMFCs, the reaction media vessel can be made of any material suitable for the reaction, e.g. steel, glass, email, polymers. Furthermore, the complete controller can be constructed with simple and cheap elements and is not sensitive to environmental influences as conventional CMFCs or other known mass flow controllers.

In one embodiment, the pressurizing element comprises a pump feeding the fluid out of the tank into the mixer. Said pump may be constructed in any known way, e.g. as a piston pump or a syringe pump. The pump as well as the tank should be placed upon the scale, which in turn determines the overall weight of the fluid contained in the tank and the pressurizing element. Advantageously, said scale may be reset to an initial point (zero point) before starting to feed fluid, in order to eliminate the constant weights of the apparatus like the tank, the pump etc.

With a pressurizing element comprising a pump, however, vibrations and pressure pulses may occur as described in the introduction. Thus, in a preferred embodiment the pressurizing element may comprise an inert fluid at a predetermined pressure which is sufficient to press the fluid, which is to be fed into the mixer, out of the tank and into said mixer at the predetermined pressure. Thus, vibrations and pressure pulses generated by a pump can be avoided advantageously in this embodiment. Such non-vibrating and non-moving dosage system allows further processing (pre-cooling, pre-heating, pre-mixing of two or more lines etc.) with simple tube connections.

If said inert fluid flows into said tank containing the fluid, which is to be fed into the mixer, the overall weight of said tank changes accordingly. Said change, however, does not reflect mass flow of the fluid, which is to be fed into the mixer, and thus would cause errors in mass flow detection. Thereto, the inert fluid advantageously is an inert gas. Due to low density of such inert gas, inflow thereof does not effect the mass flow determination significantly. Moreover, such errors may be corrected within the flow estimator itself.

Preferably said tank is sufficiently large such that escape of fluid into the mixer does not affect the pressure inside said tank significantly.

In the preferred embodiment a fluid passage connects said mixer and tank, wherein a control valve is provided within said fluid passage to control the flow of said fluid from said tank into said mixer. A controller receives a target flow rate of said fluid, selected by an operator, and an actual flow rate of said fluid. Said controller then outputs a control signal to said control valve indicating a valve position to adjust the flow rate accordingly.

Thus the fluid is provided to the mixer due to the over-pressure inside the tank in the preferred embodiment. Therefore no pump, in particular no piston pump, is necessary which in conventional dosage systems implies pressure fluctuations within the feed flow. Thus a dosage system according to this embodiment of the present invention can provide the fluid with less or no pressure pulsation within the fluid feed flow. FIG. 3B depicts feed pressure delivered to a micro-reactor by a dosage system according to the preferred embodiment of the present invention. As can be seen from comparison with FIG. 3A pressure characteristics smoothens significantly.

By feedback control of the control valve based on the difference between the target feed flow rate and the detected actual feed flow rate, said desired target feed flow rate can be realized with high accuracy without knowledge of pump parameters as stroke etc. Furthermore, absence of a pump advantageously not only reduces costs, but also avoids impurities introduced by said pump or leakage occurring at said pump. This is most preferably when dealing with hazardous fluids and can provide a much better sealed system.

Preferably the static mixer is a micro-reactor, i.e. a small-dimensioned static mixer with or without temperature control having structured cavities and inner surfaces which optionally may be coated with catalysts adapted to the desired chemical reaction.

In said preferred embodiment over-pressure of the fluid contained in the tank is applied by an inert fluid. Thereto said tank contains additionally said inert fluid at a predetermined pressure pressurizing the fluid. This allows simple pressurizing of said fluid and re-establishing the predetermined over-pressure by supplying additional inert fluid.

Said inert fluid preferably is an inert gas, which is preferably insoluble or poorly soluble in said fluid. Thus on the one hand, chemical reactions are not affected by said inert gas while at the other hand such inert gas is easier to handle in contrast to inert liquid and in particular can be compressed to a higher degree. Additionally, bubble formation due to the pressure drop behind the control valve advantageously may be prevented by using such a poorly soluble or insoluble inert gas. The over-pressure by supplying a gas will add an additional mass upon the scale, if the gas' reservoir is not placed on the scale too. However, due to the wide difference of the specific density between the pressurizing gas and the fluid fed into the mixer, said additional weight can easily be compensated in computation. Additional weight of pipes and the connecting system does not affect the accuracy of the dosage system.

In order to further avoid or correct for noises due to sample rate, numeric operations etc., said weight is time-differentiated analogously or numerically to yield the actual flow rate, while said weight and/or the value resulting by time differentiated said weight is filtered before output. Principally, determination and control of mass flow may be performed with any precision required. Said precision is limited only by the precision and inertia (i.e. time-delayed reaction) of the scale.

This determination of the actual flow rate not only can be performed at low cost, requiring only a scale and a calculating unit to process the weights, but also avoids interacting flow rate measure apparatuses and therefore improves seal characteristics of the dosage system advantageously. Furthermore, the flow estimator also can be provided in the controller of the dosage system.

In a further preferred embodiment in an automatic control mode the control signal output to the control valve comprises a controller output which corresponds to a difference between the target flow rate and the actual flow rate of said fluid. This controller output may be calculated preferably by way of proportional, integral or differential control as it is known in the art, or by any combination thereof. Also other control methods as fuzzy control, neural networks or the like may be employed.

In order to increase response of the controller, a feedforward controller output, which corresponds to a feedforward valve position input by an Operator to the controller, may be added to the controller output to form the control signal output to said control valve. Since a conventional PID controller acts upon a controlled error between target and actual values only, such controllers show a certain delay, in which said controlled error must build up large enough to yield a sufficient control amount. Adding a predetermined feedforward controller output, in contrast, advantageously yields a significant control signal ab initio.

A first and/or second ramp unit can determine a target feed flow rate trajectory and feedforward controller output respectively, based on a time period and the target feed flow rate/-feedforward valve position. Since input of a constant target value all of a sudden (corresponding to a step-wise target trajectory) would lead to an abrupt change of the controller output and thereby to a pressure pulse within the dosage system, it is advantageous to smoothly increase the target value up to the predetermined amount, giving the dosage system time to follow such smoother change.

A dosage system according to the present invention may further be operated in a manual control mode alternatively. In such manual control mode a manual valve position, input by an operator, then is output as said control signal to said control valve instead of the controller output.

Control modes may be switched from automatic to manual or vice versa by the operator. In the latter case, advantageously the manual valve position may be selected as said feedforward valve position. Then a smooth transfer from manual to automatic mode can be achieved, since at first the former pre-selected manual valve position is maintained via the feedforward controller output, and subsequently the difference of actual and target feed flow rate is minimised by the controller output.

BRIEF DESCRIPTION OF THE DRAWINGS

Other objects, features and advantages of the present invention derive from the depending claims and the description of preferred embodiments. Thereto

DETAILED DESCRIPTION OF THE INVENTION

Figure 1:
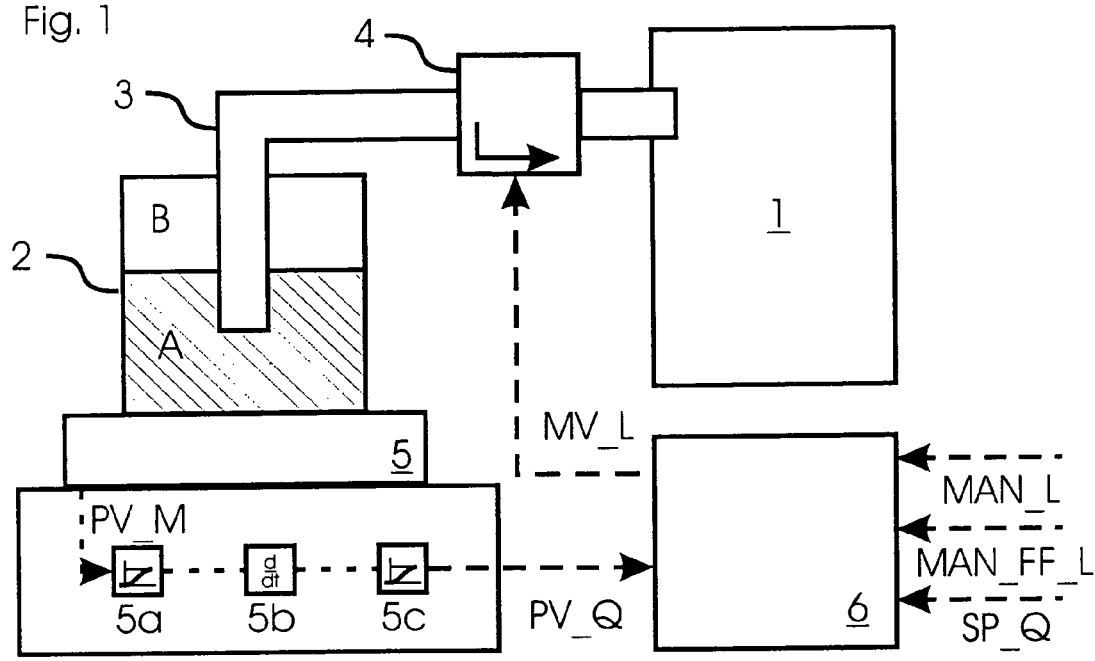
FIG. 1 shows schematically a dosage system according to an embodiment of the present invention.

A dosage system according to an embodiment of the present invention can provide a mixer 1 with a fluid A at a desired flow rate SP_Q without high pressure fluctuations.

Thereto the system comprises a tank 2 containing said fluid A and an inert fluid B with a predetermined pressure. Said pressure is sufficient to press the fluid A out of tank 2 and into mixer 1.

Said inert fluid B preferably is an inert gas B, which more preferably is poorly soluble in the fluid. Argon (Ar), Helium (He) or Nitrogen ($N_2$) may be used advantageously as inert gas for example.

Mixer 1 and tank 2 are connected with one another by a fluid passage 3, wherein a control valve 4 is provided. Said control valve 4 allows adjustment of the actual feed flow rate PV_Q of fluid A delivered to mixer 1. Thereto control valve 4 receives a control signal from a controller 6 in order to adjust the feed flow rate. Said control signal may, for example, indicate a valve position MV_L of control valve 4, wherein a more opened valve position yields a higher feed flow rate. Preferably said control valve is a pneumatic control valve.

Said flow rate is estimated by a flow estimator. Thereto the weight PV_M of fluid A contained in tank 2 is detected by a scale 5. Scale 5 for example may detect the overall weight of tank 2, fluid A and inert gas B contained therein or—not necessarily—the tank's and inert gas' weight may be subtracted. Differentiating said weight PV_M yields the change of mass over time which corresponds to the mass flow rate of fluid A escaping from tank 2. In other words, subtracting an actual weight PV_M(t1) by a preceding weight PV_M(t0) and dividing by the elapsed time period (t1−t0) yields the feed flow rate PV_Q(t)=[(PV_M(t1)−PV_M(t0))/(t1−t0)]. In an alternative embodiment said mass flow rate may be divided by fluid's A density so that a volume feed flow rate can be determined instead.

In order to smooth detection noise as well as noise generated by the numeric operations, a filter 5a and/or a filter 5c may filter the signal indicating weight PV_M before and after calculating the feed flow rate PV_Q in a calculation unit 5b respectively. A second-order-filter, a butterworth filter or any other filter known may be employed as filter 5a and/or 5c. Preferably, two independent signal filters are performed, namely the weight signal of the scale and the derivative calculation.

Figure 2:
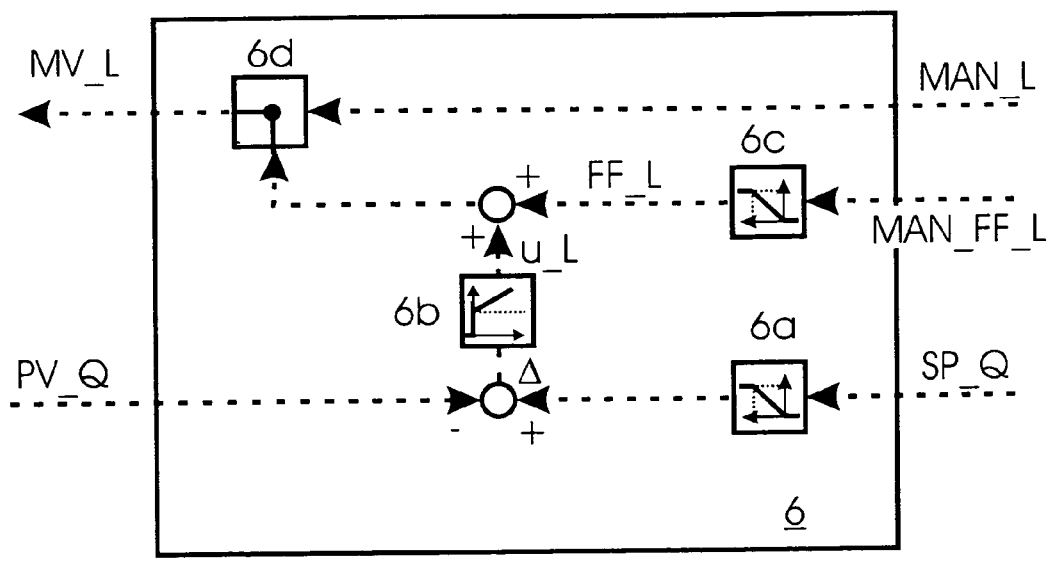
FIG. 2 shows the structure of the controller in FIG. 1.
Figure 3A:
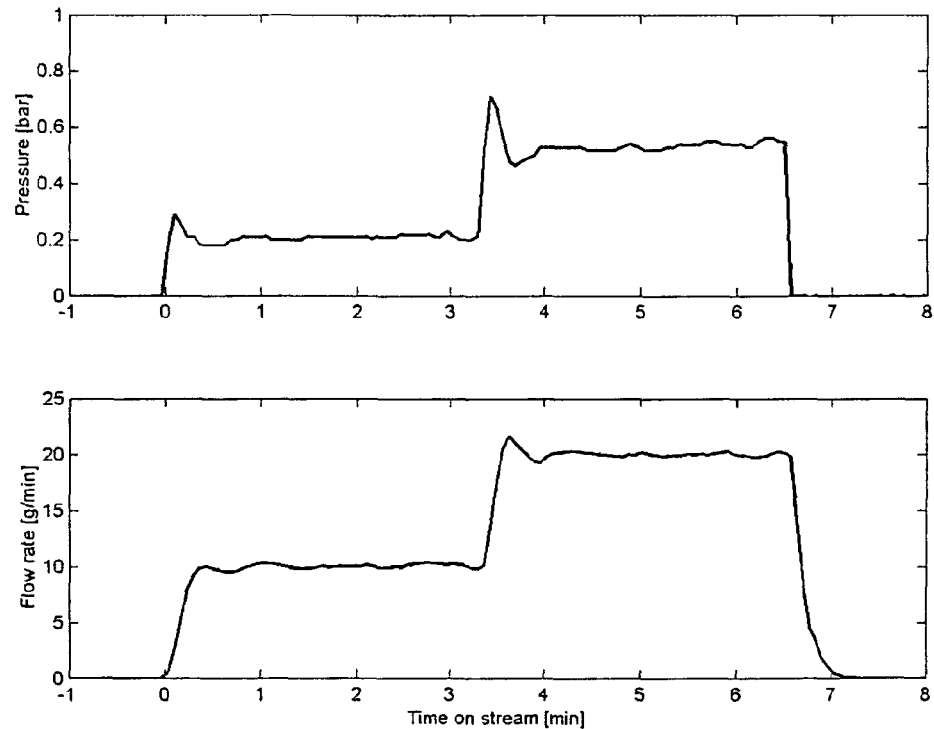
FIGS. 3A, 3B depict the feed pressure realized by a dosage system with a pump and a dosage system with an inert gas according to the present invention, respectively.
Figure 3B:
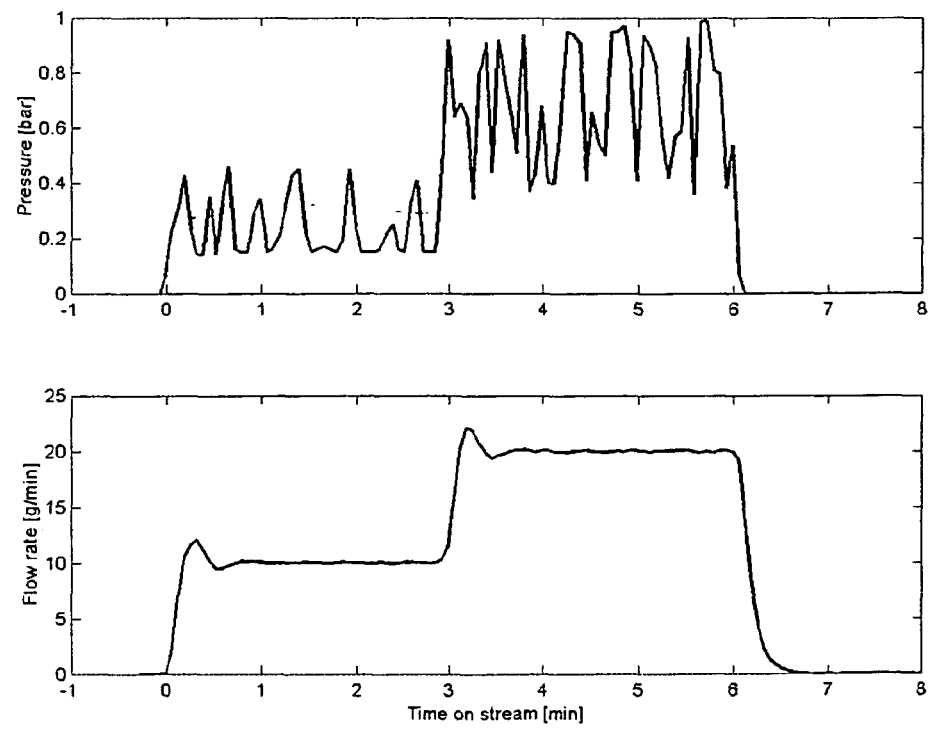

In an automatic control mode as shown in FIG. 2 feed flow rate PV_Q is feedback-controlled in controller 6. Thereto said detected actual feed flow rate PV_Q is input into said controller 6 as well as a predetermined or target feed flow rate SP_Q. In a preferred embodiment controller 6 comprises a first ramp unit 6a which calculates a target feed flow rate trajectory SP_Q(t) to reach the target feed flow rate SP_Q smoothly within a predetermined or freely selectable time period T_ramp. Such trajectory may for example satisfy the following equation:

$$SP\_Q(t) \equiv \begin{cases} 0 & t < 0 \\ \frac{SP\_Q}{T\_ramp} \cdot t & \Leftrightarrow \quad 0 \leq t \leq T\_ramp \\ SP\_Q & t < T\_ramp \end{cases}$$

The detected actual feed flow rate PV_Q is subtracted from said target feed flow rate trajectory SP_Q(t) or target feed flow rate SP_Q to yield a controlled error e(t)=SP_Q(t)−PV_Q(t). This controlled error then is input into a control unit 6b which yields a corresponding controller output u_L. Said control unit may employ any known control algorithm like e.g. a proportional (P), integral (I) or differential (D) controller or any combination thereof. In the preferred embodiment control unit 6b employs a PID controller, thus a PID controller yielding a controller output $$u\_L(t)=Pe(t)+Dd(e(t))/dt+I\!\int(e(t))dt$$

wherein P, D and I denote predetermined or freely selectable controller parameters respectively. Said controller output u_L then can be output to control valve 4 as a control signal indicating valve position MV_L.

In a preferred embodiment an additional feedforward controller output FF_L is added to the controller output u_L. Thereto the operator inputs a feedforward valve position MAN_FF_L. In order to smoothen the complete control cycle and to limit abrupt changes of the valve position—which would cause pressure pulses—controller 6 advantageously may comprises a second ramp unit 6c which calculates said feedforward controller output FF_L(t) to reach the feedforward valve position MAN_FF_L smoothly within a predetermined or freely selectable time period analogously to first ramp unit 6a. Then controller output u_L and feedforward controller output FF_L(t) are added, yielding the control signal MV_L=u_L+FF_L which is output to control valve 4 and indicates a valve position to be realized therein. Such additional feedforward term FF_L yields a faster response so that the target flow rate SP_Q is reached more quickly.

In a manual control mode valve position Mv_L may also be input directly by the operator as manual valve position MAN_L (see FIG. 2). Controller 6 allows switching between both control modes by switch 6d which either selects the control signal u_L+FF_L or manual valve-position MAN_L as output signal MV_L to control valve 4.

In order to provide a smooth switch from manual to automatic control mode, feedforward controller output FF_L may be set to the manual valve position MAN_L (not shown) upon switching. Thus valve 4 will firstly be maintained in the former manually determined valve position MV_L=MAN_L=FF_L and afterwards will be adapted smoothly to the selected target feed flow rate SP_Q due to the controlled error.

An upper and lower limit of the valve position MV_L may be predetermined in order to avoid exceeding mass flow or back flow.

The control described above may be realized in any known way, e.g. in a digital or analog controller and may be implemented by a micro-controller, freely programmable multi-purpose or personal computer or the like.

The invention claimed is:

1. A dosage system for feeding a fluid to a static mixer, said system comprising:
   a tank containing said fluid at a predetermined pressure and a pressurizing element;
   a fluid passage connecting said static mixer and said tank;
   a scale detecting the weight of fluid contained in said tank,
   a modulating control valve provided within said fluid passage which controls the flow rate of said fluid from said tank into said static mixer;
   a controller for receiving a target flow rate of said fluid, and an actual flow rate of said fluid; and for outputting a control signal to said control valve indicating a valve position to adjust the actual flow rate from a first actual flow rate greater than zero to a second actual flow rate greater than zero; and
   a flow estimator outputting said actual flow rate to said controller based on said weight of said fluid as detected by said scale at different points of times.

2. The dosage system of claim 1, wherein said static mixer is a microreactor.

3. The dosage system of claim 1, wherein said control valve is a pneumatic control valve.

4. The dosage system of claim 1, wherein the pressurizing element pressurizing said fluid comprises a pump.

5. The dosage system of claim 1, wherein said flow estimator comprises a calculation unit in which said weight is time-differentiated to yield said actual flow rate; and
wherein said weight and/or the value resulting by time-differentiated said weight is filtered by a filter unit provided before and/or after said calculation unit.

6. The dosage system of claim 1, wherein the pressurizing element pressurizing said fluid comprises an inert fluid.

7. The dosage system of claim 6 wherein said inert fluid is an inert gas which is substantially insoluble in said fluid.

8. The dosage system of claim 7, wherein said inert gas is Helium (He), Argon (Ar) or Nitrogen ($N_2$).

9. The dosage system of claim 1, wherein said controller comprises a control unit; and wherein said control signal output to said control valve relates to a controller output, which is calculated by said control unit corresponding to a difference between said target flow rate of said fluid and said actual now rate of said fluid in an automatic control mode.

10. The dosage system of claim 9, wherein said control unit is a PID controller.

11. The dosage system of claim 9, wherein said controller further comprises a first ramp unit for determining a target feed flow rate trajectory based on the target feed flow rate and a time period.

12. The dosage system of claim 9, wherein said control valve further comprises a switch for outputting a manual valve position, input by an operator, as said control signal to said control valve instead of the controller output determined by said control unit, in a manual control mode.

13. The dosage system of claim 12, wherein, upon switching said switch from manual to automatic control mode, said manual valve position is selected as a feedforward valve position.

14. The dosage system of claim 9, wherein a feedforward controller output, which corresponds to a feedforward valve position input by an operator to the controller, is added to the controller output, calculated by said control unit, to form the control signal output to said control valve.

15. The dosage system of claim 14, wherein said controller further comprises a second ramp unit for determining said feedforward controller output based on said feedforward valve position and a time period.

16. The dosage system of claim 14, wherein, upon switching said switch from manual to automatic control mode, said manual valve position is selected as said feedforward valve position.

17. A method for controlling a dosage system, comprising the steps of:
providing a tank containing said fluid at a predetermined pressure and a pressurizing element;
providing a fluid passage connecting said static mixer and said tank;
providing a scale detecting the weight of fluid contained in said tank;
providing a modulating control valve provided within said fluid passage which controls the flow rate of said fluid from said tank into said static mixer;
receiving a target flow rate and an actual flow rate of said fluid;
outputting a control signal to said control valve indicating a valve position to adjust the flow rate based on said target and said actual flow rate of said fluid
providing a controller for receiving the target flow rate of said fluid and the actual flow rate of said fluid; and for outputting the control signal to said control valve indicating the valve position to adjust the actual flow rate from a first actual flow rate greater than zero to a second actual flow rate greater than zero; and
providing a flow estimator outputting said actual flow rate to said controller based on said weight of said fluid as detected by said scale at different points of times.

18. The method of claim 17, wherein said actual flow rate is determined by a flow estimator based on a weight of the fluid contained in said tank as detected by said scale at different points of times.

19. The method of claim 18, wherein said weight is time-differentiated to yield said actual flow rate; and wherein said weight and/or the value resulting by time-differentiated said weight is filtered before output.

20. The method of claim 17, wherein said control signal relates to a controller output, which is calculated corresponding to a difference between said target flow rate of said fluid and said actual flow rate of said fluid in an automatic control mode.

21. The method of claim 20, further comprising calculating a time derivative of said difference and calculating an integral of said difference over time, wherein said calculation for determining said controller output comprises:
a factor corresponding to the difference;
a controller parameter corresponding to the time derivative of said difference; and
a factor corresponding to the integral of said difference over time.

22. The method of claim 20, wherein a target feed flow rate trajectory is determined based on the target feed flow rate and a time period.

23. The method of claim 20, wherein a manual valve position, input by an operator, can be output as said control signal to said control valve instead of the controller output in a manual control mode.

24. The method of claim 23, wherein, upon switching from manual to automatic control mode, said manual valve position is selected as a feedforward valve position.

25. The method of claim 20, wherein a feedforward controller output, which corresponds to a feedforward valve position input by an operator to the controller, is added to the controller output to form the control signal output to said control valve.

26. The method of claim 25, wherein said feedforward controller output is determined based on said feedforward valve position and a time period.

27. The method of claim 25, wherein, upon switching from manual to automatic control mode, said manual valve position is selected as said feedforward valve position.

* * * * *